United States Patent
Craig et al.

[15] 3,694,514
[45] Sept. 26, 1972

[54] 10-BROMOALKYL-ANTHRACENES

[72] Inventors: Paul N. Craig, Ambler; Charles L. Zirkle, Berwyn, both of Pa.

[73] Assignee: Smith, Kline & French Laboratories, Philadelphia, Pa.

[22] Filed: March 5, 1971

[21] Appl. No.: 121,540

Related U.S. Application Data

[60] Division of Ser. No. 742,171, July 3, 1968, which is a continuation-in-part of Ser. No. 631,584, April 18, 1967, abandoned, which is a continuation-in-part of Ser. No. 526,975, Feb. 14, 1966, abandoned.

[52] U.S. Cl. ................................................260/649 F
[51] Int. Cl. ........................C07c 25/00, C07c 25/14
[58] Field of Search ...................................260/649 F

[56] References Cited

FOREIGN PATENTS OR APPLICATIONS

| | | | |
|---|---|---|---|
| 694,036 | 8/1967 | Belgium | 260/649 F |
| 1,240,807 | 1/1964 | France | 260/649 F |

*Primary Examiner*—Howard T. Mars
*Attorney*—William H. Edgerton et al.

[57] ABSTRACT

10-Bromoalkyl-anthracenes wherein the nucleus is substituted by chlorine, methyl, trifluoromethyl, methylthio, methylsulfonyl or N,N-dimethylsulfamyl are useful as intermediates for the preparation of corresponding 10-aminoalkyl-9,10-dihydroanthracenes which have utility as tranquilizers and antidepressants.

2 Claims, No Drawings

10-BROMOALKYL-ANTHRACENES

This application is a division of Ser. No. 742,171, filed on July 3, 1968 now Patent No. 3,622,630 which in turn is a continuation-in-part of application Ser. No. 631,584 filed Apr. 18, 1967 and now abandoned which is a continuation-in-part of application Ser. No. 526,975 filed Feb. 14, 1966 and now abandoned.

This invention relates to novel substituted 10-aminoalkyl-9,10-dihydroanthracenes which have useful pharmacodynamic properties. More specifically the novel products of this invention effect the central nervous system and have utility as tranquilizers. The tranquilizing activity is demonstrated in standard pharmacological test procedures employed in characterizing chlorpromazine and trifluoperazine at oral dosages in rats, mice and monkeys approximately equivalent to the latter agents.

The novel 10-aminoalkyl-9,10-dihydroanthracenes of this invention are represented by the following general structural formula:

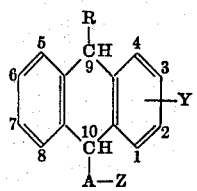

Formula I when:
R represents hydrogen, lower alkyl, such as methyl or ethyl, or phenyl;
Y represents halogen having an atomic weight of less than 80, preferably chlorine, lower alkyl such as methyl, trifluoromethyl, lower alkylthio such as methylthio, lower alkylsulfonyl such as methylsulfonyl or N,N-dimethyl-sulfamyl;
A represents an alkylene chain, straight or branched, of from two to four carbon atoms; and
Z represents amino, mono-loweralkylamino, di-loweralkylamino, or a monocyclic heterocyclic amino moiety containing from four to 12 carbon atoms, and containing a maximum of two hetero ring members selected from the group of oxygen, nitrogen and sulfur, such as particularly morpholinyl, thiamorpholinyl, N-pyrrolidinyl, N-piperidinyl, N'-lower-alkyl-N-piperazinyl, N'-(ω-hydroxy-lower-alkyl)-N-piperazinyl, N'-(ω-hydroxy-alkoxy-lower-alkyl)-N-piperazinyl or N'-(ω-acetoxy-lower-alkyl)-N-piperazinyl.

Advantageous compounds of this invention are represented by the following formula:

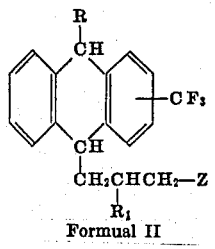

Formual II when:
R and R₁ represent hydrogen or methyl; and
Z represents monomethylamino, dimethylamino, N-piperidinyl, N'-methyl-N-piperazinyl, N'-(ω-hydroxy-ethyl)-N-piperazinyl, N'-(ω-acetoxy-ethyl)-N-piperazinyl.

Particularly advantageous compounds are 10-(3-dimethylaminopropyl)-2-trifluoromethyl-9,10-dihydroanthracene and 9-methyl-10-(3-dimethylaminopropyl)-2-trifluoromethyl-9,10-dihydroanthracene.

Compounds of formulas I and II above wherein R is lower alkyl or phenyl, in addition to having tranquilizing activity, also have utility as antidepressants. The anti-depressant activity is demonstrated in standard pharmacological test procedures employed in characterizing imipramine and amitryptyline at oral dosages in mice and rats approximately equivalent to the latter agents.

By the terms lower alkyl or alkoxy where used herein alone or in combination with other terms, groups having from one to four, preferably one to two carbon atoms are indicated.

This invention also includes stable, pharmaceutically acceptable, acid addition salts of the above defined bases formed with nontoxic organic and inorganic acids. Such salts are easily prepared by methods known to the art. The base is reacted with either the calculated amount of organic or inorganic acid in aqueous miscible, solvent such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methane-sulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-chlorotheophylline and 8-bromotheophylline. Exemplary of such inorganic salts are those with hydrochloric, hydrobromic, sulfuric, sulfamic, phosphoric, and nitric acids. These salts may also be prepared by the classical method of double decomposition of appropriate salts which is well known to the art.

The 10-aminoalkyl-9,10-dihydroanthracenes of this invention are prepared by one of several routes depending on the nuclear (Y) substituent and the presence of a 9-alkyl or phenyl group. When the 9-position is unsubstituted (R=H) the products are obtained advantageously via the fully aromatic anthracenes which are prepared as shown in the following synthetic scheme illustrated by way of example for Z represented by dimethylamino:

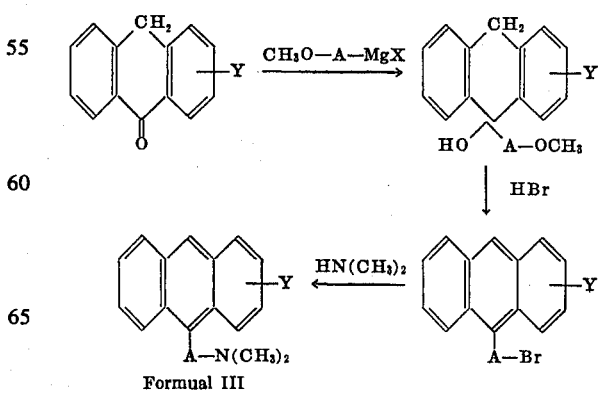

Formual III in which Y and A are as defined in Formula I and X is halogen, preferably chlorine.

According to the above procedure, the substituted anthrone is reacted with a methoxyalkyl magnesium halide to give the 10-methoxyalkyl-10-hydroxy-9,10-dihydroanthracenes. Advantageously the reaction is carried out in an inert organic solvent such as an ether, for example diethyl ether, dioxane or, preferably, tetrahydrofuran at a temperature of from about 0°C. to room or ambient temperature for a period of about 3 to 24 hours. Removal of the solvent and treatment of the residue with water and/or an ammonium salt solution separates the 10-methoxyalkyl derivative. The latter is treated with concentrated (48 percent) hydrobromic acid to give simultaneous dehydration of the 10-hydroxy group and cleavage of the methyl ether linkage. The resulting 10-bromoalkylanthracenes are treated with a di-loweralkylamine as shown above or ammonia, a mono-loweralkylamine, pyrrolidine, piperidine, N-lower alkyl-piperazine or N-(ω-acetoxy-lower alkyl)-piperazine to give the corresponding 10-aminoalkylanthracenes of Formula III. The latter useful intermediates are reduced to give the 9,10-dihydroanthracene products of this invention with phosphorus and hydrogen iodide or with hydrogen and copper chromite catalyst when Y is trifluoro-methyl.

Hydrolysis of the N'-acetoxyalkyl-N-piperazinyl products thus formed with for example sodium hydroxide solution yields the corresponding N'-(ω-hydroxy-lower alkyl)-N-piperazinyl derivatives of Formula I. Further alkylation of the N-piperazinyl compounds thus obtained with an alkylene oxide or alkylene halohydrin yields other N'-substituted piperazinyl compounds of Formula I.

The 9-unsubstituted anthrone starting materials used as above are either known or prepared conveniently as illustrated by the following outline of the preparation of 2-trifluoromethyl-10-anthrone. Phenyl magnesium bromide is reacted with 2-bromo-4-trifluoromethyl-benzonitrile to give 2-bromo-4-trifluoromethyl-benzophenone. The latter is reduced with for example phosphorus and hydrogen iodide to yield 2-bromo-4-trifluoromethyl-diphenylmethane, which is reacted first with magnesium, then with carbon dioxide to give 2-benzyl-5-trifluoromethylbenzoic acid. Cyclization by acid treatment with for example concentrated sulfuric acid furnishes the 2-trifluoromethyl-10-anthrone.

The compounds of Formula I when R is lower alkyl or phenyl and especially when Y is trifluoromethyl are prepared as shown in the following sequence illustrated by way of example for R is methyl and Z is dimethylamino:

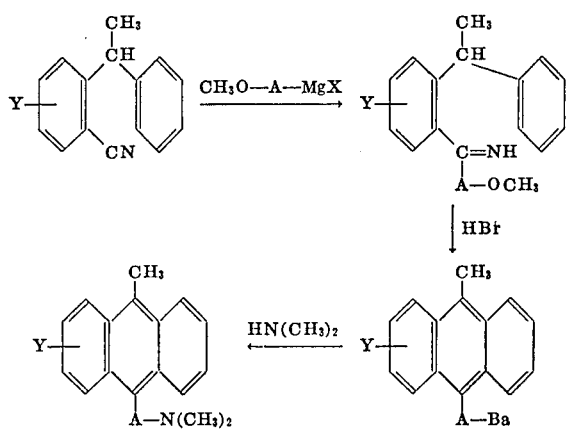

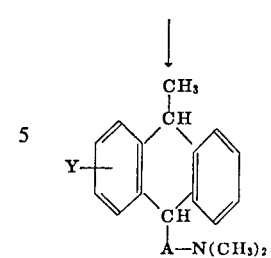

According to the above procedure, the substituted 2-(α-methylbenzyl)-benzonitrile is reacted with a methoxyalkyl magnesium halide as described more fully hereinabove to give the methoxyalkyl imine derivative. The latter is treated with concentrated (48 percent) hydrobromic acid to simultaneously ring close and cleave the methyl ether linkage. The resulting 10-bromoalkyl-anthracene is treated with the appropriate amine to give the corresponding 10-aminoalkylanthracene which is reduced with, preferably, hydrogen and copper chromite catalyst to the 9-alkyl-9,10-dihydroanthracene product.

The benzonitrile starting materials used as above are either known or prepared conveniently as illustrated by the following outline of the preparation of 2-(α-methylbenzyl)-5-trifluoromethylbenzonitrile. 2-Bromo-4-trifluoromethylbenzophenone is reacted with a tri-loweralkyl sulfoxonium halide such as trimethylsulfoxonium iodide in a suitable organic solvent for example dimethyl sulfoxide usually in the presence of a strong alkali such as an alkali metal hydride, i.e. sodium or potassium hydride or an alkali metal lower alkoxide such as sodium methylate or ethylate to give 1-phenyl-1-(2-bromo-4-trifluoromethylphenyl)-ethylene oxide. The latter is reduced with a bimetallic hydride such as lithium aluminum hydride in a suitable nonpolar organic solvent such as ethyl ether or tetrahydrofuran to α-phenyl-α-(2-bromo-4-trifluoromethylphenyl)-ethanol. This alcohol is then reduced with phosphorus and hydrogen iodide to 2-(α-methylbenzyl)-5-trifluoromethyl-bromobenzene which is treated with cuprous cyanide to give the corresponding benzonitrile. Alternatively, this benzonitrile may be hydrolyzed to the benzoic acid and cyclized with for example sulfuric acid to give 9-methyl-2-trifluoromethyl-10-anthrone which may be converted to products of this invention as described hereinabove.

Either of the two general procedures described above for the preparation of compounds of Formula I may be interchanged. For example, 2-bromo-4-trifluoromethyl-diphenylmethane is converted with cuprous cyanide to the 2-benzyl-5-trifluoromethyl-benzonitrile which is then reacted with a methoxyalkyl magnesium halide to give the imine followed by similar reactions as described above to furnish the corresponding 9-unsubstituted-9,10-dihydroanthracene products.

Some of the compounds of this invention may be present as cis or trans isomers as well as mixtures of these isomers. For example, when R in formula I is other than hydrogen the geometrical isomers may be represented as follows:

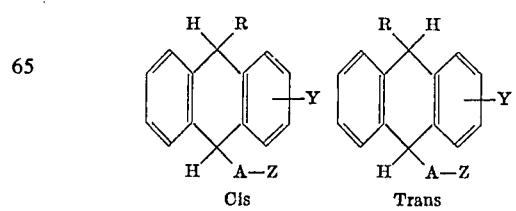

The isomers are separated by fractional crystallization of their acid addition salts from a suitable solvent or mixture of solvents such as, for example, acetone-ether or ethanol-ether. Also, a pure isomer may be obtained directly from the reduction of the 10-aminoalkyl anthracene.

In addition, it will be readily apparent to one skilled in the art that certain compounds of this invention may be present as optical isomers. These isomers are separated by recrystallization of the optically active acid addition salts, for example the d-and l-di-p-toluoyltartrates of the racemic free base. Alternatively, a precursor in the synthesis of the products of formula I may be resolved into d-and l-isomers and the separated isomers reacted further to give the optically active products.

The connotation of the general formulas presented herein is to include all isomers, the separated d or l optical isomers as well as the dl mixture and the separated cis or trans isomers as well as the mixture of these isomers.

A useful pharmacological indicator of tranquilizing activity is the production of ptosis in rats. In this procedure rats are examined after oral administration of a test compound at hourly intervals for a ptotic effect and the incidence of ptosis is recorded as a percentage of the number of test animals. Another test procedure for evaluating tranquilizing activity is the suppression of rage in mice. A test compound is administered orally to mice preselected for their ability to exhibit rage episodes during footshock and the animals are tested again. The percentage of animals exhibiting protection against rage is recorded.

Antidepressant activity is measured pharmacologically by the ability of a compound to prevent reserpine-induced ptosis in rats or mice. In this procedure a test compound is administered orally to the animals followed at various time intervals by 1 mg/kg of reserpine (i.v.) and the test animals are observed 45 minutes thereafter for ptosis prevention.

The following table 1 sets forth comparative data obtained by employing the above described test procedures for selected compounds of this invention and the closest known prior art 10-aminoalkyl-9,10-dihydroanthracenes.

TABLE 1

| Compound | Oral dose (mg./kg. free base) | Rat ptosis maximum Percent production | Rat ptosis maximum Percent prevention |
|---|---|---|---|
| A. [structure with (CH₂)₃—N(CH₃)₂] U.S. 2,403,483 | 29 | 0 | |
| | 29 | | 17 |
| B. [structure with CH₃ CH₃ and (CH₂)₃—N(CH₃)₂] Austria 223,611 | 44 | | 45.4 |

TABLE 1—Continued

| Compound | Oral dose (mg./kg. free base) | Rat ptosis maximum Percent production | Percent prevention |
|---|---|---|---|
| C. [structure with —CF₃ and (CH₂)₃—N(CH₃)₂] | 2.7 | 0 | |
| | 5.4 | 12.5 | |
| | 10.8 | 62.5 | |
| | 21.6 | 75.0 | |

$ED_{50} = 11.1$ mg./kg.

| D. Cis Isomer [structure with H, CH₃, —CF₃, H, (CH₂)₃—N(CH₃)₂] | 2.7 | | 30 |
| | 5.4 | | 30 |
| | 10.9 | | 10 |
| | 21.7 | | 50 |
| | 43.4 | | 80 |

$ED_{50} = 14.5$ mg./kg.

From the above table it is observed that the prior art compounds A and B are either inactive or demonstrate activity at doses considerably higher than compounds C and D of the invention.

In general the separated l-isomer of a racemic compound of this invention is more active pharmacologically than the corresponding racemic mixture as illustrated in table 2 for tranquilizing activity.

TABLE 2

| Compound | Oral $ED_{50}$ mouse rage suppression (mg./kg. free base) |
|---|---|
| A. [structure with —CF₃ and (CH₂)₃—N(CH₃)₂] | |
| dl | 6.2 |
| l | 3.2 |
| B. Cis isomer [structure with H, CH₃, —CF₃, H, (CH₂)₃—N(CH₃)₂] | |
| dl | 32.1 |
| l | 10.3 |

As noted hereinabove the compounds of formulas I and II wherein R is lower alkyl or phenyl have both tranquilizing and antidepressant activity. Thus the compound D in table 1 has an $ED_{50}$ of 14.5 mg/kg in the rat ptosis prevention test (antidepressant activity) and the same compound B (dl-isomer) in table 2 has an $ED_{50}$ of 32.1 mg/kg in the mouse rage suppression test (tranquilizing activity). To demonstrate that compounds of formulas I and II when R is hydrogen do not have antidepressant activity, test results are shown in table 3 for mouse ptosis prevention.

TABLE 3

| Compound | Oral dose (mg./kg. free base) | Mouse ptosis maximum percent prevention |
|---|---|---|
| A. 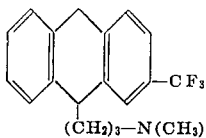 | 13.5 | 0 |
| B. Cis isomer 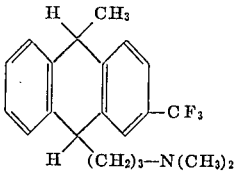 | 0.13<br>0.25<br>0.51<br>1.02 | 11.1<br>20.0<br>44.4<br>60.0 |
| | ED₅₀=0.74 mg./kg. | |

Thus, although the parent compound A shown in table 3 has no antidepressant activity, the presence of a 9-methyl substituent in compound B incorporates a component of antidepressant activity while retaining the already present tranquilizing activity of the parent compound A.

A further aspect of this invention relates to 9-substituted-10-aminoalkyl-9,10-dihydroanthracenes which are not benzo ring substituted. These compounds have antidepressant activity with no tranquilizing activity. The antidepressant activity is demonstrated in standard pharmacological test procedures employed in characterizing imipramine and amitryptyline at oral dosages in mice and rats approximately equivalent to the latter agents. These 9-substituted-10-aminoalkyl-9,10-dihydroanthracenes are represented by the following general structural formula:

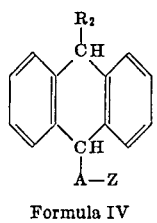

Formula IV when:

R₂ represents lower alkyl, such as methyl or ethyl, or phenyl; and

A and Z are as defined in formula I above.

The compounds of the formula IV are prepared advantageously by direct alkylation of an R₂-substituted-9,10-dihydroanthracene with a tertiary aminoalkyl halide, such as dimethylaminopropyl chloride, in an inert organic solvent, for example dimethylsulfoxide or an ether. Preferably an alkali metal salt of the 9,10-dihydroanthracene is employed which is prepared for example from sodium hydride or butyl lithium. Alternatively, methods analogous to those described for the preparation of compounds of formula I above may be employed to obtain compounds of formula IV. Similarly these compounds may be present as cis, trans isomers which are separated by fractionation. Also, a pure cis isomer upon treatment with sodium hydride in dimethylsulfoxide gives a mixture of cis, trans isomers from which the pure trans isomer is separated.

In contrast to the compounds of formulas I and II wherein R is lower alkyl or phenyl which have both tranquilizing and antidepressant activity, the compounds of formula IV which share the structural feature of 9-substituent but lack the benzo ring substituent have antidepressant activity but no tranquilizing activity. This is shown in the following table 4.

TABLE 4

| Compound | Oral dose (mg./kg. free base) | Rat ptosis maximum Percent production | Percent prevention |
|---|---|---|---|
| A. Cis isomer 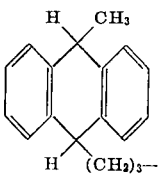 | 88.5<br>22.1 | 0 | 80 |

The novel compounds of this invention may be administered orally or parenterally in conventional dosage unit forms such as tablets, capsules, injectables or the like, by incorporating the appropriate dose of a compound of formula I or IV with carriers according to accepted pharmaceutical practices. In practice, unit doses of from 10 mg. to 250 mg. administered from one to four times a day are effective.

The following examples are not limiting but are illustrative of compounds of this invention and procedures for their preparation and will serve to make fully apparent all of the compounds embraced by the general formulas given above. Alternatives and modifications of the general procedures set forth herein will be apparent to those skilled in the art.

EXAMPLE 1

A mixture of 12.7 g. of magnesium and 56.7 g. of 3-methoxypropyl chloride in 300 ml. of ether is refluxed for 1 hour. The resulting mixture is cooled to about 10°C. and a suspension of 34.3 g. of 2-chloro-10-anthrone in 250 ml. of ether is added. The reaction mixture is allowed to warm to room temperature and stand overnight. Most of the ether is removed and the residue decomposed with ammonium sulfate in a minimum of water plus ice. The mixture is extracted with ether, the extract evaporated and the residue taken up into benzene. The benzene is extracted with alkali and then evaporated to give 2-chloro-10-hydroxy-10-(3-methoxypropyl)-9,10-dihydroanthracene.

A solution of 28.7 g. of the above 9,10-dihydroanthracene in 110 ml. of 48 percent hydrobromic acid and 225 ml. of glacial acetic acid is refluxed for 6 hours. The reaction mixture is then concentrated, diluted with water and made strongly alkaline. The solution is extracted with ether and the dried extract is chromatographed on alumina to give 2-chloro-10-(3-bromopropyl)-anthracene, m.p. 77°–78 °C.

Into a solution of 10.0 g. of the above anthracene in 30 ml. of benzene is bubbled about 12 g. of dimethylamine at room temperature. The resulting mixture is heated in a pressure bottle on a steam bath for four hours, cooled and allowed to stand. The reaction mixture is made basic, treated with ether and filtered. The separated, dried ether solution is evaporated to give 2-chloro-10-(3-dimethylaminopropyl)-anthracene; hydrochloride salt, m.p. 234°–235°C.

A mixture of 2.0 g. of the above free base and 2.0 g. of red phosphorus in 10 ml. of 57 percent hydroiodic acid is refluxed for 24 hours. The reaction mixture is diluted with water, filtered, made basic and extracted with ether to give 2-chloro-10-(3-dimethylaminopropyl)-9,10-dihydroanthracene; hydrochloride salt, m.p. 201°–203°C.

EXAMPLE 2

A mixture of 18.2 g. of 2-chloro-10-(3-bromopropyl)-anthracene (prepared as in Example 1) and 11.0 g. of N-methylpiperazine in 50 ml. of toluene is refluxed for 24 hours. The reaction mixture is made basic and extracted with ether to give 2-chloro-10-[3-(N'-methyl-N-piperazinyl)-propyl]-anthracene; hydrochloride salt, m.p. 260°C. dec.

A mixture of 2.0 g. of the above free base and 2.0 g. of red phosphorus in 10 ml. of 57 percent hydroiodic acid is refluxed for 24 hours. The reaction mixture is diluted, filtered and made basic to give 2-chloro-10-[3-(N'-methyl-N-piperazinyl)-propyl]-9,10-dihydroanthracene; hydrochloride salt, m.p. 233°C. dec.

Similarly, by employing an equivalent amount of dibutylamine instead of N-methylpiperazine in the above sequence, there is obtained 2-chloro-10-(3-dibutylaminopropyl)-9,10-dihydroanthracene.

EXAMPLE 3

To a solution of 20 g. of 2-bromo-4-trifluoromethylbenzonitrile in 300 ml. of ether is added 29 ml. of a 3M solution of phenylmagnesium bromide in 100 ml. of ether and the resulting mixture is refluxed for 3 hours, then stirred for 16 hours at room temperature. The dried ether solution is evaporated and the residue treated with excess dilute hydrochloric acid to give the imine which is heated on the steam bath for one hour. This mixture is extracted with ether to give after fractional distillation, 2-bromo-4-trifluoromethylbenzophenone, m.p. 52°–53°C.

A mixture of 12.5 g. of the above benzophenone and 12.5 g. of red phosphorus in 25 ml. of 57 percent hydroiodic acid is refluxed and stirred under nitrogen for 24 hours. The reaction mixture is diluted with water, filtered and solid washed with ether and water. The ether solution is dried and evaporated to give 2-bromo-4-trifluoromethyldiphenylmethane, b.p. 97°–100b°C./0.2 mm.

The Grignard reagent prepared from 5.0 g. of the above diphenylmethane and 0.4 g. of magnesium in 50 ml. of tetrahydrofuran is poured into 200 ml. of ether saturated with carbon dioxide at −80°C. The reaction mixture is extracted with dilute sodium hydroxide solution, neutralized with dilute acid and concentrated. The residue is taken up in ether, washed with dilute hydrochloric acid, dried and concentrated to give 2-benzyl-5-trifluoromethylbenzoic acid, m.p. 148°–150°C.

A solution of 19.9 g. of the above acid in 58 ml. of concentrated sulfuric acid is stirred at room temperature for three hours, poured into 700 ml. of water and filtered to give 2-trifluoromethyl-10-anthrone, m.p. 148°–150°C.

A mixture of 8.65 g. of 3-methoxypropyl chloride and 1.9 g. of magnesium in 100 ml. of ether is stirred and refluxed for 2 hours. To this mixture at 10°C. is added a suspension of 6.0 g. of 2-trifluoromethyl-10-anthrone in ether. After stirring for three hours at 10°C., then 16 hours at room temperature, the reaction mixture is poured into ammonium chloride solution and extracted with ether. The extract is evaporated, taken up in benzene, extracted with base, washed with water, dried and evaporated to give 2-trifluoromethyl-10-hydroxy-10-(3-methoxypropyl)-9,10-dihydroanthracene. The latter, 2.0 g., in 7.5 ml. of 48 percent hydrobromic acid and 14 ml. of glacial acetic acid is refluxed for six hours. The reaction mixture is evaporated, taken into ether and chromatographed to give 2-trifluoromethyl-10-(3-bromopropyl)-anthracene, m.p. 87°–88°C.

The above anthracene (15.0 g.) and 18 g. of dimethylamine in 45 ml. of benzene is heated on the steam bath in a pressure bottle for 6 hours. The reaction mixture is treated with water and extracted with dilute hydrochloric acid. The acid extract is made basic, extracted with ether and the dried ether extract is evaporated to give 2-trifluoromethyl-10-(3-dimethylaminopropyl)-anthracene, b.p. 155°–160°C./0.35 mm.

A mixture of 3.8 g. of the above anthracene, 0.6 g. of copper chromite and 15 ml. of decalin is heated at 200°C. under 4,000 lbs. hydrogen pressure for three hours to give upon workup the product 2-trifluoromethyl-10-(3-dimethylaminopropyl)-9,10-dihydroanthracene; hydrochloride salt, m.p. 194.5°–196°C.

EXAMPLE 4

To a mixture of 0.72 g. of sodium hydride (56 percent suspension in mineral oil) and 3.7 g. of trimethylsulfoxonium iodide in 25 ml. of dimethylsulfoxide is added 5.0 g. of 2-bromo-4-trifluoromethylbenzophenone (prepared as in Example 3) in 8 ml. of dimethylsulfoxide. The resulting mixture is stirred for 30 minutes at room temperature then heated at 50°–55°C. for 90 minutes. The reaction mixture is poured into water, extracted with ether, and the extract evaporated to give 1-phenyl-1-(2-bromo-4-trifluoromethylphenyl)-ethylene oxide, m.p. 77°–78°C.

The above oxide (12.7 g.) in 55 ml. of ether is added to 1.0 g. of lithium aluminum hydride in 55 ml. of ether and the mixture is refluxed for 1 hour. Water (2 ml.) is added and the reaction mixture is filtered to give α-phenyl-α-(2-bromo-4-trifluoromethylphenyl)-ethanol. The latter (12.5 g.) is refluxed and stirred with 12.5 g. of red phosphorus and 25 ml. of 57 percent hydroiodic acid for 24 hours. The reaction mixture is filtered to give 2-(α-methylbenzyl)-5-trifluoromethylbromobenzene.

A mixture of 2.4 g. of the above bromobenzene, 0.7 g. of cuprous cyanide and 1.5 ml. of dimethylformamide is stirred and refluxed for four hours. The reaction mixture is poured into a solution of 3.1 g. of ferric chloride in 4.5 ml. of water and 0.8 ml. of concentrated hydrochloric acid, extracted with chloroform, water-washed, dried and distilled to give 2-(α-methylbenzyl)-5-trifluoromethylbenzonitrile.

To the Grignard solution formed with 6.2 g. of 3-methoxypropyl chloride and 1.4 g. of magnesium in 75 ml. of tetrahydrofuran is added 5.0 g. of the above nitrile in 50 ml. of tetrahydrofuran and the mixture is refluxed for two hours. The reaction mixture is decomposed with ammonium chloride solution and extracted with ether. The dried ether extract is evaporated to give the methoxypropyl imine (29 g.) which is refluxed for six hours in 100 ml. of 48 percent hydrobromic acid and 200 ml. of acetic acid. The reaction mixture is evaporated, extracted with ether and the dried extract chromatographed to give 2-trifluoromethyl-9-methyl-10,(3-bromopropyl)-anthracene.

A mixture of 12.0 g. of the above anthracene and 18 g. of dimethylamine in 60 ml. of dry benzene is heated in a pressure bottle on a steam bath for 5 hours. The reaction mixture is treated with water and extracted with dilute hydrochloric acid. The acid extract is made basic, extracted with ether and the dried extract evaporated to give 2-trifluoromethyl-9-methyl-10-(3-dimethylaminopropyl)-anthracene, b.p. 165°–170 °C./0.1 mm.; hydrochloride salt, m.p. 263°C. (dec.).

The above anthracene (2.0 g.) is reduced with 0.34 g. of copper chromite in 4 ml. Of decalin at 200°C. and 4,000 lbs. hydrogen for three hours to give 2-trifluoromethyl-9-methyl-10-(3-dimethylaminopropyl)-9,10-dihydroanthracene; hydrochloride salt, m.p. 179°–181°C. This is the cis-isomer.

Similarly, reaction of 2-trifluoromethyl-9-methyl-10-(3-bromopropyl)-anthracene with N-methylpiperazine as described above followed by reduction yields the corresponding 2-trifluoromethyl-9-methyl-10-[3-(N'-methyl-N-piperazinyl)-propyl]-9,10-dihydroanthracene.

EXAMPLE 5

A mixture of 12.0 g. of 2-trifluoromethyl-10-(3-bromopropyl)-anthracene (prepared as in Example 3) and 4.9 g. of N-methylpiperazine in 40 ml. of benzene is heated in a pressure bottle on the steam bath for 12 hours. Water is added to the reaction mixture, made basic and benzene separated which gives 2-trifluoromethyl-10-[3-(N'-methyl-N-piperazinyl)-propyl]-anthracene, b.p. 185°–189°C./0.1 mm.; hydrochloride salt, m.p. 280°C. (dec.).

The above anthracene free base (4.6 g.) in 10 ml. of decalin and 0.74 g. of copper chromite are heated at 200°C. and 4,000 lbs. hydrogen to give 2-trifluoromethyl-10-[3-(N'-methyl-N-piperazinyl)-propyl]9,10-dihydroanthracene; hydrochloride salt, m.p. 263°C.

Similarly, in the above reaction sequence, reacting an equivalent amount of pyrrolidine or piperidine instead of N-methylpiperazine results in the formation of 2-trifluoromethyl-10-[3-(N-pyrrolidinyl)-propyl]-9,10-dihydroanthracene and 2-trifluoromethyl-10-[3-(N-piperidinyl)-propyl]-9,10-dihydroanthracene, respectively.

EXAMPLE 6

Following the general procedures of Example 1, a mixture of 12.7 g. of magnesium and 64.0 g. of 3-methoxy-2-methylpropyl chloride in 300 ml. of ether is treated with 31.2 g. of 2-methyl-10-anthrone in 250 ml. of ether to give 2-methyl-10-hydroxy-10-(3-methoxy-2-methylpropyl)-9,10-dihydroanthracene. The latter is similarly dehydrated and hydrolyzed with 48 percent hydrobromic acid and the bromo compound reacted with dimethylamine to give 2-methyl-10-(3-dimethylamino-2-methylpropyl)-anthracene. Reduction with red phosphorus and 57 percent hydroiodic acid yields the product, 2-methyl-10-(3-dimethylamino-2-methylpropyl)-9,10-dihydroanthracene.

EXAMPLE 7

Following the procedure outlined in Example 3, 2-trifluoromethyl-10-(3-bromopropyl)-anthracene (15.0 g.) is treated with excess aqueous ammonia, methylamine or butylamine to give after reduction the products, 2-trifluoromethyl-10-(3-aminopropyl)-9,10-dihydroanthracene, 2-trifluoromethyl-10-(3-methylaminopropyl)-9,10-dihydroanthracene and 2-trifluoromethyl-10-(3-butylaminopropyl)-9,10-dihydroanthracene, respectively.

EXAMPLE 8

A mixture of 12.0 g. of 2-trifluoromethyl-10-(3-bromopropyl)-anthracene (prepared as in Example 3) and 8.4 g. of N-(β-acetoxyethyl)-piperazine in 75 ml. of toluene is refluxed for 12 hours to give after workup, 2-trifluoromethyl-10-[3-(N'-β-acetoxyethyl-N-piperazinyl)-propyl]-anthracene which is reduced with copper chromite, hydrogen to yield the product, 2-trifluoromethyl-10-[3-(N'-β-acetoxyethyl-N-piperazinyl)-propyl]-9,10-dihydroanthracene.

Hydrolysis of the above acetoxyethyl compound furnishes 2-trifluoromethyl-10-[3-(N'-β-hydroxyethyl-N-piperazinyl)-propyl]-9,10-dihydroanthracene.

Alkylation of the above hydroxyethyl compound with bromohydrin in the presence of potassium carbonate yields 2-trifluoromethyl-10-[3-(N'-ω-hydroxyethoxyethyl-N-piperazinyl)-propyl]-9,10-dihydroanthracene.

EXAMPLE 9

A mixture of 10 g. of 2-trifluoromethyl-9-methyl-10-(3-dimethylaminopropyl)-anthracene (prepared as in Example 4), 15 g. of red phosphorus and 70 ml. of 57 percent hydroiodic acid solution is refluxed and stirred for 40 minutes. The reaction mixture is poured into water, made basic with sodium hydroxide solution, stirred for 1 hour with excess ether and filtered. The dried filtrate is evaporated in vacuo to give the free base which is a mixture consisting of about 80 percent of the trans- and 20 percent of the cis-isomer of 2-trifluoromethyl-9-methyl-10-(3-dimethylaminopropyl)-9,10-dihydroanthracene.
Recrystallization of the hydrochloride salt of the mixture from acetone-ethyl acetate yields the pure trans-isomer hydrochloride, m.p. 200°–201°C.

EXAMPLE 10

A mixture of 18.5 g. of l-di-p-toluoyltartaric acid and 16.7 g. of cis-2-trifluoromethyl-9-methyl-10-(3-dimethylaminopropyl)-9,10-dihydroanthracene (prepared as in Example 4) in 100 ml. of boiling methanol and 10 ml. of water yields the l-di-p-toluoyltartrate salt, m.p. 167°C. (foam), $[\alpha]_D^{25} = +3.66°$. The free base liberated from this salt with ammonium hydroxide and ether is converted to the hydrochloride salt of d-cis-2-trifluoromethyl-9-methyl-10-(3- dimethylaminopropyl)-9,10-dihydroanthracene, m.p. 209°–210°C., $[\alpha]_D^{25} = +9.62°$ (2 percent ethanol).

The filtrate from the crude l-di-p-toluoyltartrate salt above is treated with ammonium hydroxide and ether to regenerate 13.5 g. of the cis free base. The latter with 15.0 g. of d-di-p-toluoyltartaric acid in 200 ml. of methanol and 20 ml. of water forms the d-di-p-toluoyltartrate salt, $[\alpha]_D^{25} = -2.4°$ (1 percent ethanol). The liberated free base is converted to the hydrochloride salt of l-cis-2-trifluoromethyl-9-methyl-10-(3-dimethylaminopropyl)-9,10-dihydroanthracene, m.p. 206-208°C., $[\alpha]_D^{25} = -9.6°$ (2 percent ethanol).

EXAMPLE 11

To a solution of 71.8 g. of 2-benzyl-5-trifluoromethylbenzonitrile (prepared from 2-bromo-4-trifluoromethyldiphenylmethane by reaction with cuprous cyanide) in 100 ml. of ether is added gradually 183 ml. of 3M methyl magnesium bromide in ether. The reaction mixture is refluxed with stirring for six hours, decomposed with aqueous ammonium chloride, extracted with ether and evaporated. The residue is taken up in 250 ml. each of 48 percent hydrobromic acid solution and acetic acid, refluxed for 18 hours, evaporated and extracted with chloroform. The filtered extract is evaporated, the residue is dissolved in methanol and the solvent removed to give 2-trifluoromethyl-10-methylanthracene, m.p. 98°–100°C.

A mixture of the above prepared anthracene (33.2 g.) and 34.2 g. of N-bromosuccinimide in 300 ml. of carbon tetrachloride, catalyzed by 0.34 g. of benzoyl peroxide, is refluxed and stirred for 2 hours. The hot reaction mixture is filtered and cooled to precipitate 2-trifluoromethyl-10-bromomethylanthracene.

To 5.2 g. of 57 percent sodium hydride in 100 ml. of dimethylsulfoxide at 50°C. is added slowly a solution of 19.8 g. of diethylmalonate in dimethylsulfoxide and the mixture is heated at 75°C. for 45 minutes. A slurry of 36.5 g. of 2-trifluoromethyl-10-bromomethylanthracene in dimethylsulfoxide is added and the resulting mixture is heated at 75°C. for 1 hour. The reaction mixture is quenched with water and extracted with ether to give diethyl (3-trifluoromethyl-10-anthracenyl)-methylmalonate. The latter (50.7 g.) is hydrolyzed with 41 g. of potassium hydroxide in 200 ml. of 60 percent aqueous ethanol to the free malonic acid which is heated at 185°–200°C. to obtain 2-trifluoromethylanthracene-10-propionic acid.

A mixture of 32.7 g. of the above prepared propionic acid and 48 g. of red phosphorus in 160 ml. of 57 percent hydroiodic acid and 75 ml. of acetic acid is refluxed and stirred for three hours. The reaction mixture is diluted with water, extracted with chloroform, washed with water and evaporated to yield 2-trifluoromethyl-9,10-dihydroanthracene-10-propionic acid, m.p. 153°–155°C.

A solution of 8.0 g. of 2-trifluoromethyl-9,10-dihydroanthracene-10-propionic acid and 3.0 g. of d-α-phenethylamine in 45 ml. of ethanol is clouded with 50 ml. of water while boiling to give the d-α-phenethylamine salt, m.p. 179°–181°C., $[\alpha]_D^{25} = -3.2°$ (1 percent ethanol). This salt is acidified with hydrochloric acid, extracted with ether and the dried extract evaporated to give 1-2-trifluoromethyl-9,10-dihydroanthracene-10-propionic acid. The latter is refluxed with 5 ml. of thionyl chloride for 2 hours and the resulting acid chloride dissolved in 20 ml. of benzene is saturated with dimethylamine to yield the dimethylamide. The amide (2.2 g.) in ether is added to 1.1 g. of lithium aluminum hydride in ether, refluxed for 1 hour and worked up to give d-2-trifluoromethyl-10-(3-dimethylaminopropyl)-9,10-dihydroanthracene; hydrochloride salt, m.p. 201°–202°C., $[\alpha]_D^{25} = +4.92°$ (1 percent ethanol).

The filtrate from the crude d-α-phenethylamine salt above is evaporated, acidified and extracted with ether to regenerate 2-trifluoromethyl-9,10-dihydroanthracene-10-propionic acid. The latter (6.2 g.) and 2.4 g. of l-α-phenethylamine dissolved in 30 ml. of ethanol is clouded while boiling with 50 ml. of water to give the l-α-phenethylamine salt, m.p. 177°–179°C., $[\alpha]_D^{25} = +3.46°$. This salt is acidified to liberate d-2-trifluoromethyl-9,10-dihydroanthracene-10-propionic acid which is treated as above with thionyl chloride, the acid chloride reacted with dimethylamine and the amide reduced with lithium aluminum hydride to yield l-2-trifluoromethyl-10-(3-dimethylaminopropyl)-9,10-dihydroanthracene; hydrochloride salt, m.p. 200°–202°C., $[\alpha]_D^{25} = -5.73°$ (1 percent ethanol).

EXAMPLE 12

Following the general procedure of Example 3, 18.2 g. of 2-bromo-4-methylthiobenzonitrile (obtained from 4-methylthiobenzonitrile) and 29 ml. of 3M phenylmagnesium bromide in ether solution are reacted to give 2-bromo-4methylthiobenzophenone. A mixture of the latter and red phosphorus in 57 percent hydroiodic acid is refluxed and stirred under nitrogen for 24 hours to give 2-bromo-4-methylthiodiphenylmethane. The Grignard reagent prepared from this diphenylmethane in tetrahydrofuran is poured into ether saturated with carbon dioxide at −80°C. Workup yields 2-benzyl-5-methylthiobenzoic acid. A solution of the acid in concentrated sulfuric acid is stirred at room temperature to give the ring-closed product, 2-methylthio-10-anthrone.

To the Grignard reagent prepared from 8.65 g. of 3-methoxypropyl chloride in ether is added a suspension of 5.5 g. of 2-methylthio-10-anthrone in ether. After stirring for 3 hours at 10°C. and 18 hours at room temperature, the reaction mixture is decomposed and worked up to give 2-methylthio-10-hydroxy-10-(3-methoxypropyl)-9,10-dihydroanthracene. The latter is refluxed in 48 percent hydrobromic acid and glacial acetic acid to give 2-methylthio-10-(3-bromopropyl)-anthracene.

The above anthracene (13.7 g.) and 18 g. of dimethylamine in benzene is heated on the steam bath in a pressure bottle for six hours to give upon workup 2-methylthio-10-(3-dimethylaminopropyl)-anthracene which is hydrogenated in the presence of copper chromite to yield 2-methylthio-10-(3-dimethylaminopropyl)-9,10-dihydroanthracene.

Similarly, by employing 2-bromo-4-methylsulfonylbenzonitrile (obtained from the 4-methylthio derivative by oxidation with chromic anhydride in sulfuric acid) in the above described reaction sequence there is obtained as a final product, 2-methylsulfonyl-10-(3-dimethylaminopropyl)-9,10-dihydroanthracene.

EXAMPLE 13

Following the general procedure of Example 3, 16.8 g. of 3-bromo-4-cyano-N,N-dimethylbenzenesulfonamide (obtained from 4-cyano-N,N-dimethylbenzenesulfonamide) in ether is reacted with 29 ml. of 3M phenylmagnesium bromide in ether and the mixture worked up to give 2-bromo-4-(N,N-dimethylsulfamyl)-benzophenone which is reduced with red phosphorus and hydroiodic acid to the corresponding diphenylmethane. The Grignard reagent prepared from this diphenylmethane is reacted with carbon dioxide with cooling to give 2-benzyl-5-(N,N-dimethylsulfamyl)-benzoic acid. Ring closure is effected via concentrated sulfuric acid to yield 2-(N,N-dimethylsulfamyl)-10-anthrone.

The Grignard reagent prepared from 8.65 g. of 3-methoxypropyl chloride is reacted with 5.0 g. of the above-prepared anthrone to give 2-(N,N-dimethylsulfamyl)-10-hydroxy-10-(3-methoxypropyl)-9,10-dihydroanthracene. The latter is refluxed in 48 percent hydrobromic acid and glacial acetic acid to give 2-(N,N-dimethylsulfamyl)-10-(3-bromopropyl)-anthracene.

The above anthracene (12.6 g.) and 18 g. of dimethylamine in benzene is heated on the steam bath in a pressure bottle for 6 hours to give upon workup 2-(N,N-dimethylsulfamyl)-10-(3-dimethylaminopropyl)-anthracene which is hydrogenated in the presence of copper chromite to yield 2-(N,N-dimethylsulfamyl)-10-(3-dimethylaminopropyl)-9,10-dihydroanthracene.

EXAMPLE 14

To the solution of 32.9 g. of 2-bromo-4-trifluoromethylbenzophenone in 400 ml. of ether is added one equivalent of ethylmagnesium bromide in ether and the resulting mixture is refluxed for 4 hours. Treatment with aqueous acid gives α-phenyl-α-(2-bromo-4-trifluoromethylphenyl)-propanol. The latter (13.0 g.) is refluxed and stirred with 12.5 g. of red phosphorus and 25 ml. of 57 percent hydroiodic acid for 24 hours to yield 2-(α-ethylbenzyl)-5-trifluoromethylbromobenzene.

A mixture of 2.5 g. of the above bromobenzene, 0.7 g. of cuprous cyanide and 1.5 ml. of dimethylformamide is stirred and refluxed for 4 hours. The reaction mixture is poured into a solution of 3.1 g. of feric chloride in 4.5 ml. of water and 0.8 ml. of concentrated hydrochloric acid, extracted with chloroform, water-washed, dried and distilled to give 2-(α-ethylbenzyl)-5-trifluoromethyl-benzonitrile.

To the Grignard reagent formed with 6.2 g. of 3-methoxypropyl chloride in 75 ml. of tetrahydrofuran is added 5.2 g. of the above nitrile and the mixture is refluxed for two hours. The decomposed reaction mixture yields the methoxypropyl imine which is refluxed for 6 hours in 100 ml. of 48 percent hydrobromic acid and 200 ml. of acetic acid. The reaction mixture is evaporated, extracted with ether and the dried extract chromatographed to give 2-trifluoromethyl-9-ethyl-10-(3-bromopropyl)-anthracene.

A mixture of 12.5 g. of the above anthracene and 18 g. of dimethylamine in 60 ml. of dry benzene is heated in a pressure bottle on a steam bath for 5 hours. The reaction mixture is heated with water and extracted with dilute hydrochloric acid. The acid extract is made basic and further worked up to give 2-trifluoromethyl-9-ethyl-10-(3-dimethylaminopropyl)-anthracene. The latter (2.8 g.) is reduced with 0.34 g. of copper chromite in 4 ml. of decalin at 200°C. and 4,000 lbs. hydrogen to yield 2-trifluoromethyl-9-ethyl-10-(3-dimethylaminopropyl)-9,10-dihydroanthracene.

Similarly by commencing the above sequence of reactions employing phenylmagnesium bromide instead of ethylmagnesium bromide there is obtained the corresponding 2-trifluoromethyl-9-phenyl-10-(3-dimethylaminopropyl)-9,10-dihydroanthracene.

EXAMPLE 15

To a suspension of 2.1 g. of 56 percent sodium hydride in 45 ml. of dimethylsulfoxide is added gradually, with stirring, 7.5 g. of 9-methyl-9,10-dihydroanthracene and the mixture heated at 70°C. for 2 hours. A solution of 7.5 g. of 3-dimethylaminopropyl chloride in 30 ml. of dimethylsulfoxide is added and heating is continued for 3 hours. The reaction mixture is quenched with water, extracted with ether and the ether extracted with dilute hydrochloric acid. The acid extract is made basic to give the liberated base, 9-methyl-10-(3-dimethylaminopropyl)-9,10-dihydroanthracene; hydrochloride salt, m.p. 213°–216 °C.

EXAMPLE 16

To a solution of 24.8 g. of 9-methyl-9,10-dihydroanthracene in 300 ml. of ether is added over 15 minutes 96 ml. of 15 percent butyl lithium in hexane and the resulting mixture is stirred at room temperature for 2 hours. After adding 24.6 g. of 3-dimethylaminopropyl chloride, the mixture is stirred and refluxed for three hours and allowed to stand overnight. The reaction mixture is extracted with dilute hydrochloric acid, made basic, extracted with ether and distilled to give the free base, b.p. 160°C./0.5 mm. The latter is fractionated and the first fraction collected at b.p. 135°–139°C./0.15 mm. is cis-9-methyl-10-(3-dimethylaminopropyl)-9,10-dihydroanthracene; hydrochloride salt, m.p. 217°–218°C.

The second fraction obtained from above (4.5 g.) is heated about 1 hour at 70°C. with 0.81 g. of 57 percent sodium hydride in 40 ml. of dimethylsulfoxide. The reaction mixture is quenched in water, extracted with ether, dried and evaporated. The residual free base is converted to a hexamate salt in acetone and recrystallized from acetonitrile to give trans-9-methyl-10-(3-dimethylaminopropyl)-9,10-dihydroanthracene hexamate, m.p. 169°–171°C.

What we claim is:

1. A chemical compound of the structural formula:

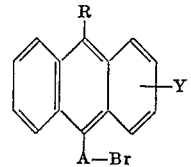

in which:
R is hydrogen, methyl, ethyl or phenyl;
Y is 2-trifluoromethyl; and
A is propylene.

2. A chemical compound in accordance with claim 1 in which R is hydrogen, Y is 2-trifluoromethyl and A is propylene.

* * * * *